US008681503B2

(12) United States Patent
Kato et al.

(10) Patent No.: US 8,681,503 B2
(45) Date of Patent: Mar. 25, 2014

(54) ELECTRONIC APPARATUS INCLUDING ELECTRONIC COMPONENT SERVING AS HEAT-GENERATING SOURCE

(75) Inventors: Seiichi Kato, Yamato (JP); Yutaka Takase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 13/040,806

(22) Filed: Mar. 4, 2011

(65) Prior Publication Data

US 2011/0242762 A1 Oct. 6, 2011

(30) Foreign Application Priority Data

Mar. 30, 2010 (JP) ................................ 2010-078019

(51) Int. Cl.
*H05K 7/20* (2006.01)

(52) U.S. Cl.
USPC ...... 361/719; 361/679.54; 361/709; 361/769; 174/75 F; 174/548

(58) Field of Classification Search
USPC ............... 361/679.46, 679.54, 688, 700–722, 361/760, 765, 767, 769–770
See application file for complete search history.

(56) References Cited

U.S. PATENT DOCUMENTS

| 5,613,861 | A * | 3/1997 | Smith et al. ...................... 439/81 |
| 6,653,557 | B2 * | 11/2003 | Wolf et al. ...................... 174/386 |
| 6,781,832 | B2 * | 8/2004 | Nakamura et al. ............. 361/695 |
| 7,035,108 | B2 * | 4/2006 | Wakabayashi et al. ........ 361/719 |
| 8,184,432 | B2 * | 5/2012 | Miyashita ................. 361/679.21 |
| 8,247,699 | B2 * | 8/2012 | Shen .............................. 174/254 |
| 2002/0117330 | A1 * | 8/2002 | Eldridge et al. .............. 174/260 |
| 2003/0161133 | A1 * | 8/2003 | Fu et al. ......................... 361/821 |
| 2008/0257585 | A1 * | 10/2008 | Morse ........................... 174/252 |

FOREIGN PATENT DOCUMENTS

| CN | 101261983 A | 9/2008 |
| JP | 2001-308569 A | 11/2001 |
| JP | 2002-247594 | 8/2002 |

OTHER PUBLICATIONS

The above references were cited in a Jul. 26, 2013 Chinese Office Action, which is enclosed with an English Translation, that issued in Chinese Patent Application No. 201110080872.X.

* cited by examiner

*Primary Examiner* — Courtney Smith
(74) *Attorney, Agent, or Firm* — Cowan, Liebowitz & Latman, P.C.

(57) ABSTRACT

An electronic apparatus having a heat-dissipating structure capable of efficiently releasing heat generated at electronic components to the outside, superior in work efficiency at the time of assembly, and capable of avoiding misalignment in the electronic components. The electronic apparatus comprising a substrate, an electronic component mounted thereon, a heat-dissipating member for releasing heat generated by the electronic component to the outside, a heat-conducting sheet having flexibility, a first portion thereof being in contact with a rear surface of the electronic component between the substrate and the electronic component, a second portion thereof being in contact with the heat-dissipating member, a hard member disposed between the first portion of the heat-conducting sheet and the substrate, a material of the hard member being harder than that of the heat-conducting sheet, and a pressing unit disposed between the hard member and the substrate and configured to press the heat-conducting sheet against the rear surface of the electronic component.

6 Claims, 4 Drawing Sheets

ELECTRONIC APPARATUS INCLUDING ELECTRONIC COMPONENT SERVING AS HEAT-GENERATING SOURCE

BACKGROUND OF THE INVENTION

1. Field of the Invention

The present invention relates to an electronic apparatus including an electronic component serving as a heat-generating source, and more particularly to an electronic apparatus, such as a digital video camera and a digital still camera.

2. Description of the Related Art

Some electronic apparatuses, such as a digital video camera, are provided with a prism having a plurality of color component light-emitting surfaces, and image pickup devices, such as CCD sensors, are respectively disposed on the plurality of color component light-emitting surfaces of the prism.

In this type of electronic apparatus, the image pickup devices are heat-generating sources. Hence, there has been proposed a technique to release heat generated at the image pickup devices to the outside through heat-conducting plates integral with cooling elements, heat-dissipating plates, and a camera chassis (Japanese Laid-Open Patent Publication (Kokai) No. 2002-247594).

In this proposal, the heat-conducting plates are pressed against the image pickup devices through the cooling elements by fastening edges of the heat-conducting plates with screws or the like to the heat-dissipating plates mounted on the camera chassis, so as to have close contact with the image pickup devices, thereby enhancing the efficiency of heat dissipation.

According to Japanese Laid-Open Patent Publication (Kokai) No. 2002-247594 cited above, however, there is a variation in the shape of the prism having the plurality of color component light-emitting surfaces. It is therefore difficult to fasten edges of all of the heat-conducting plates with screws or the like to the heat-dissipating plates to be allocated respectively to the plurality of image pickup devices. Consequently, work efficiency at the time of assembly decreases.

In addition, since the image pickup devices and the prism are bonded to each other with an adhesive agent, the bonded parts become liable to deterioration due to secular change if stress acts upon the bonded parts from the outside as the result of the heat-conducting plates being pressed against and brought into close contact with the image pickup devices. Thus, the image pickup devices may become misaligned with the prism.

SUMMARY OF THE INVENTION

The present invention provides an electronic apparatus having a heat-dissipating structure capable of efficiently releasing heat generated at electronic components to the outside, superior in work efficiency at the time of assembly, and capable of avoiding misalignment in the electronic components.

In a first aspect of the present invention, there is provided an electronic apparatus comprising a substrate, an electronic component mounted on the substrate, a heat-dissipating member adapted to release heat generated by the electronic component to the outside, a heat-conducting sheet having flexibility, a first portion thereof being in contact with a rear surface of the electronic component between the substrate and the electronic component, a second portion thereof being in contact with the heat-dissipating member, a hard member disposed between the first portion of the heat-conducting sheet and the substrate, a material of the hard member being harder than that of the heat-conducting sheet, and a pressing unit disposed between the hard member and the substrate and configured to press the heat-conducting sheet against the rear surface of the electronic component.

According to the present invention, it is possible to provide an electronic apparatus having a heat-dissipating structure capable of efficiently releasing heat generated at electronic components to the outside, superior in work efficiency at the time of assembly, and capable of avoiding misalignment in the electronic components.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Figure 1:
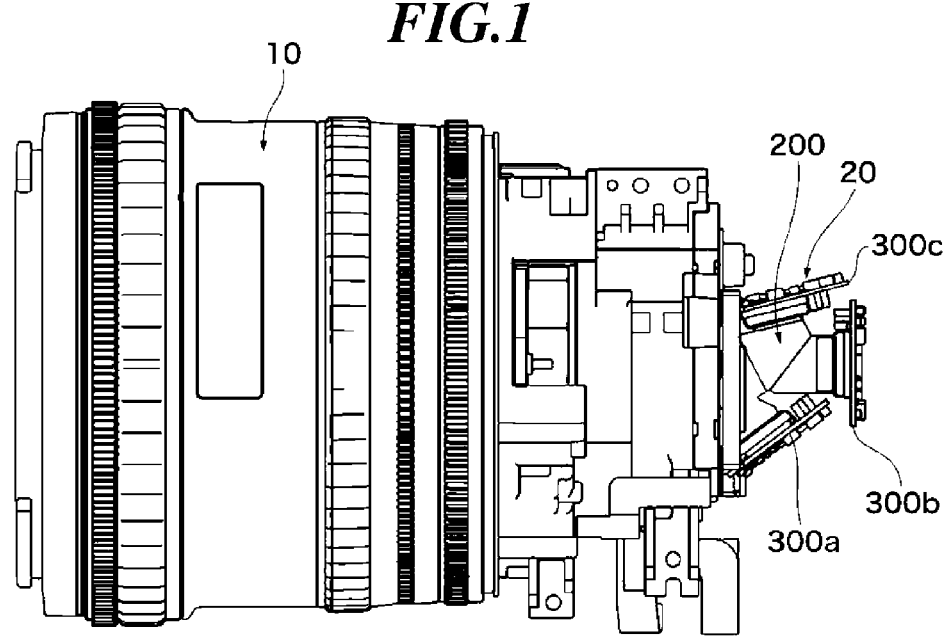
FIG. 1 is a schematic view used to explain an image pickup unit of a digital video camera according to a first embodiment of an electronic apparatus of the present invention.
Figure 2:
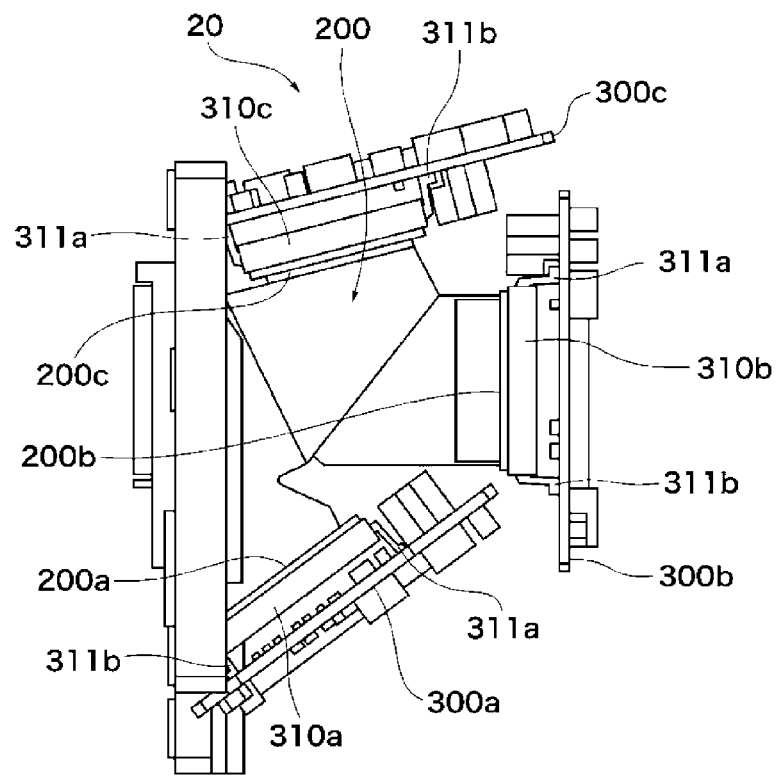
FIG. 2 is an enlarged view of the image pickup unit shown in FIG. 1.

FIG. 1 is a schematic view used to explain an image pickup unit of a digital video camera which is a first embodiment of an electronic apparatus according to the present invention, whereas FIG. 2 is an enlarged view of the image pickup unit shown in FIG. 1.

As shown in FIG. 1, in the digital video camera of the present embodiment, an image pickup unit 20 is fixed to a lens unit 10. The image pickup unit 20 is provided with a color separation prism 200 for separating light incident on the image pickup unit 20 through the lens unit 10 into a plurality of (three, for example, in the present embodiment) color components.

As shown in FIG. 2, the imaging areas of image pickup devices 310a, 310b and 310c corresponding to an example of the electronic component of the present invention are respectively bonded to three color component light-emitting surfaces 200a, 200b and 200c of the color separation prism 200 through an adhesive agent or the like.

Terminals 311a and 311b are respectively extended along two sides of each of the image pickup devices 310a, 310b and 310c opposite to each other in a direction away from the imaging areas. The extended ends of the terminals 311a and 311b are electrically connected to substrates 300a, 300b and 300c including circuits or the like for processing electrical signals output from the image pickup devices 310a, 310b and 310c. Thus, the image pickup devices 310a, 310b and 310c are mounted on the substrates 300a, 300b and 300c.

Here, in the present embodiment, heat-conducting members 400 to be described later in FIGS. 3 to 6 are respectively inserted into a space formed between the substrate 300a and the image pickup device 310a, a space formed between the substrate 300b and the image pickup device 310b, and a space formed between the substrate 300c and the image pickup device 310c. Consequently, heat generated at the image pickup devices 310a, 310b and 310c is released to the outside through the heat-conducting members 400, later-described heat-dissipating plates 600, 610 and 620, and the like.

Next, the heat-conducting members 400 will be described with reference to FIGS. 3 to 6. It should be noted that all of the heat-conducting members 400 inserted into the spaces between the substrates 300a, 300b and 300c and the image pickup devices 310a, 310b and 310c are the same. Accordingly, only the heat-conducting member 400 inserted into a space between the substrate 300a and the image pickup device 310a will be described here.

Figure 3:
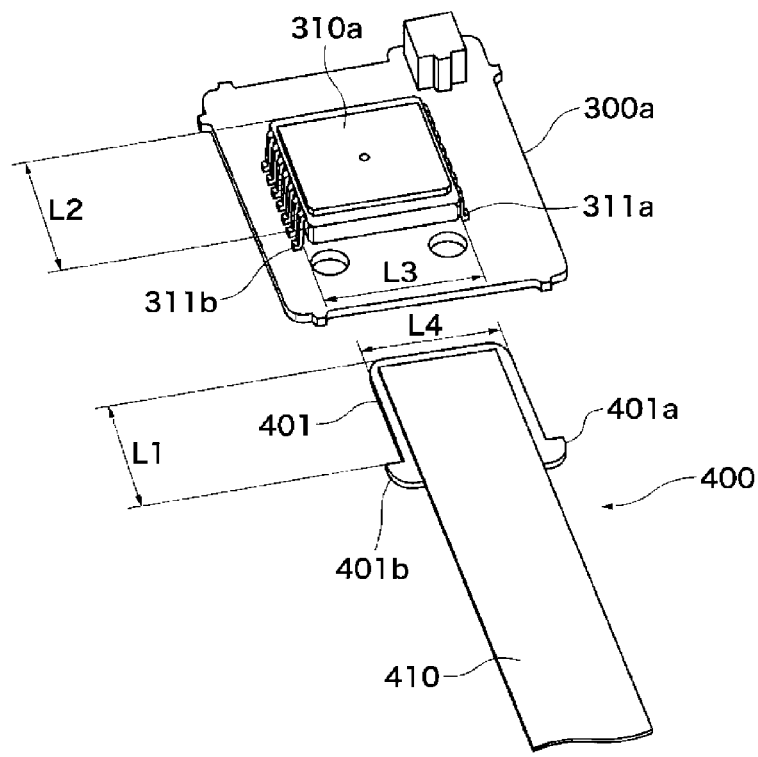
FIG. 3 is a perspective view showing a condition before a heat-conducting member is inserted into a space formed between a substrate and an image pickup device.
Figure 4:
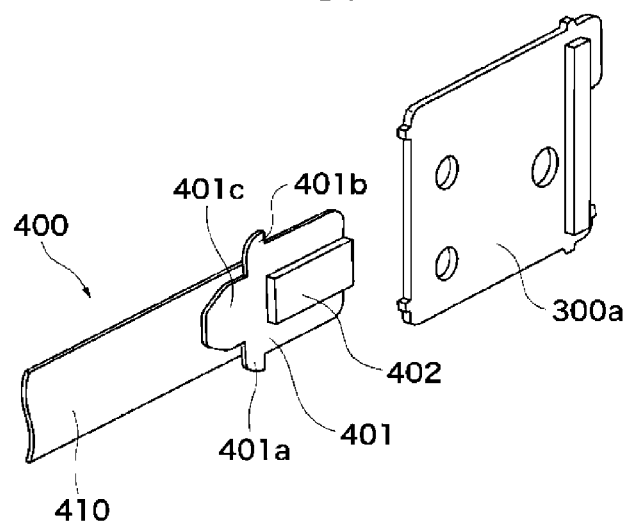
FIG. 4 is a perspective view taken from the rear surface side of FIG. 3.

FIG. 3 is a perspective view showing a condition before the heat-conducting member 400 is inserted into the space between the substrate 300a and the image pickup device 310a, whereas FIG. 4 is a perspective view taken from the rear surface side of FIG. 3.

As shown in FIGS. 3 and 4, the heat-conducting member 400 is provided with a rectangular heat-conducting sheet 410 elongated in the direction of insertion into the space between the substrate 300a and the image pickup device 310a.

The heat-conducting sheet 410 is formed of a sheet material high in thermal conductivity and superior in flexibility, for example, graphite or such metal foil as copper foil. In the present embodiment, a thin polyethylene coating is provided on both sides of the heat-conducting sheet 410.

A leading-end member 401 is adhered to a rear surface of the heat-conducting sheet 410 on the leading-end side of the insertion direction through an adhesive agent or the like.

The leading-end member 401 is formed of a material harder than the heat-conducting sheet 410, such as polycarbonate resin, acrylic resin, ABS resin or PET resin. In addition, the leading-end member 401 is formed of a thin plate material and is made wider than the heat-conducting sheet 410, so that both lateral portions of the leading-end member 401 across the width thereof overhang more than both lateral portions of the heat-conducting sheet 410 across the width thereof.

In addition, a leading-end width L4 of the leading-end member 401 in the insertion direction is slightly smaller than a width L3 across the terminals 311a and 311b of the image pickup device 310a.

Furthermore, protrusions 401a and 401b projecting outward in the width direction thereof are provided in both across-the-width lateral portions of the leading-end member 401 at a position toward a rear end thereof by a length of L1, substantially the same as a length L2 of the sides of the image pickup device 310a along which the terminals 311a and 311b are disposed.

In addition, as shown in FIG. 4, a tongue portion 401c extending in a direction opposite to the insertion direction is provided in an across-the-width central part of the rear end of the leading-end member 401. An elastic member 402 is adhered to a rear surface of the leading-end member 401 at the across-the-width central part through an adhesive agent or the like.

The elastic member 402 is formed into a plate-like shape and of rubber or the like. The elastic member 402 is arranged so as to extend from the leading edge of the leading-end member 401 in the insertion direction to a position toward the rear end of the leading-end member 401 by a length of L1, substantially the same as the length L2 of the sides of the image pickup device 310a along which the terminals 311a and 311b are disposed.

Here, in the heat-conducting member 400 configured as described above, the total thickness of the leading end in the insertion direction, i.e., a sum of the thickness dimensions of the heat-conducting sheet 410, the leading-end member 401 and the elastic member 402 in the present embodiment, is larger than the dimension of the space between the substrate 300a and the image pickup device 310a.

The leading end of the heat-conducting member 400 in the insertion direction thereof is inserted into the space between the substrate 300a and the image pickup device 310a, so that the heat-conducting sheet 410 is oppositely placed on a rear surface of the image pickup device 310a opposite to the imaging area thereof.

At this time, the heat-conducting member 400 is made easy to be inserted into the space between the substrate 300a and the image pickup device 310a by pressing the tongue portion 401c provided in the leading-end member 401 in the insertion direction with a finger or the like.

Figure 5:
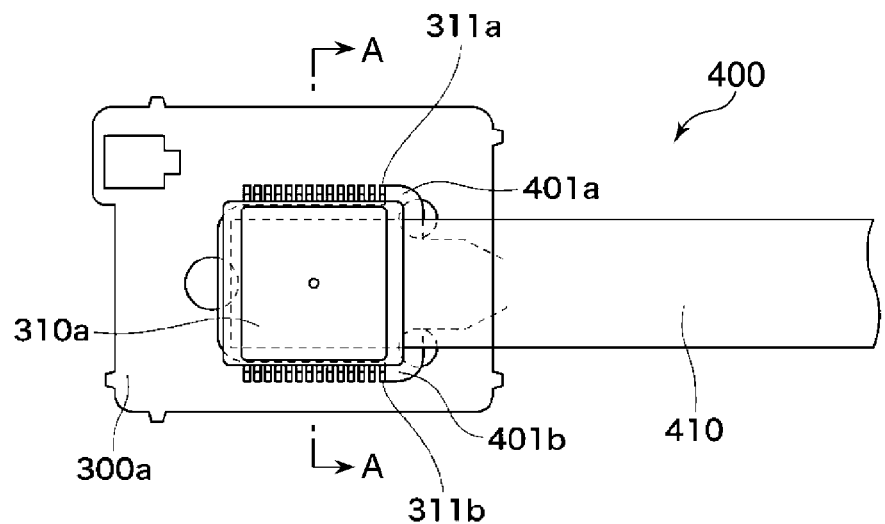
FIG. 5 is a plan view showing a condition in which the heat-conducting member of FIG. 3 is inserted into a space formed between the substrate and the image pickup device.
Figure 6:
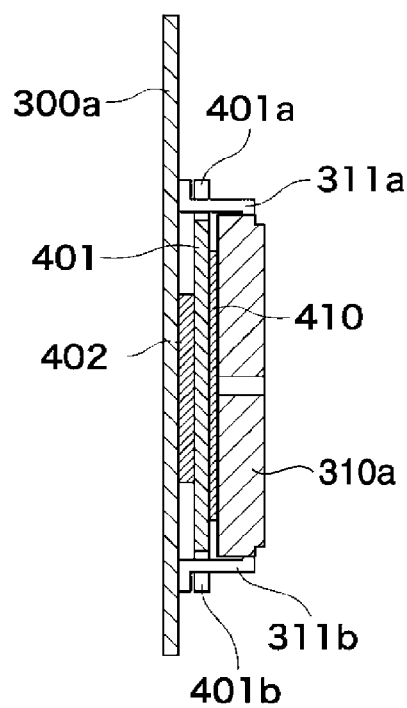
FIG. 6 is a cross-sectional view taken along the line A-A of FIG. 5.

FIG. 5 is a plan view showing a condition in which the heat-conducting member 400 is inserted into the space between the substrate 300a and the image pickup device 310a, whereas FIG. 6 is a cross-sectional view taken along the line A-A of FIG. 5.

As shown in FIGS. 5 and 6, since the total thickness of the leading end of the heat-conducting member 400 in the insertion direction is larger than the dimension of the space between the substrate 300a and the image pickup device 310a in a condition in which the heat-conducting member 400 is inserted into the space between the substrate 300a and the image pickup device 310a, the elastic member 402 is compressed within the space. Consequently, the heat-conducting sheet 410 is pressed against and brought into close contact with a rear surface of the image pickup device 310a. This pressing force prevents the heat-conducting member 400 from dropping off from the space between the substrate 300a and the image pickup device 310a.

In addition, the position of the heat-conducting member 400 in the insertion direction is determined as the result of placing the protrusions 401a and 401b provided in the leading-end member 401 in abutment with the terminals 311a and 311b of the image pickup device 310a.

Furthermore, the position of the heat-conducting member 400 in the width direction thereof is determined as the result of setting the width of the leading-end member 401 slightly smaller than the width L3 across the terminals 311a and 311b (FIG. 3).

Figure 7:
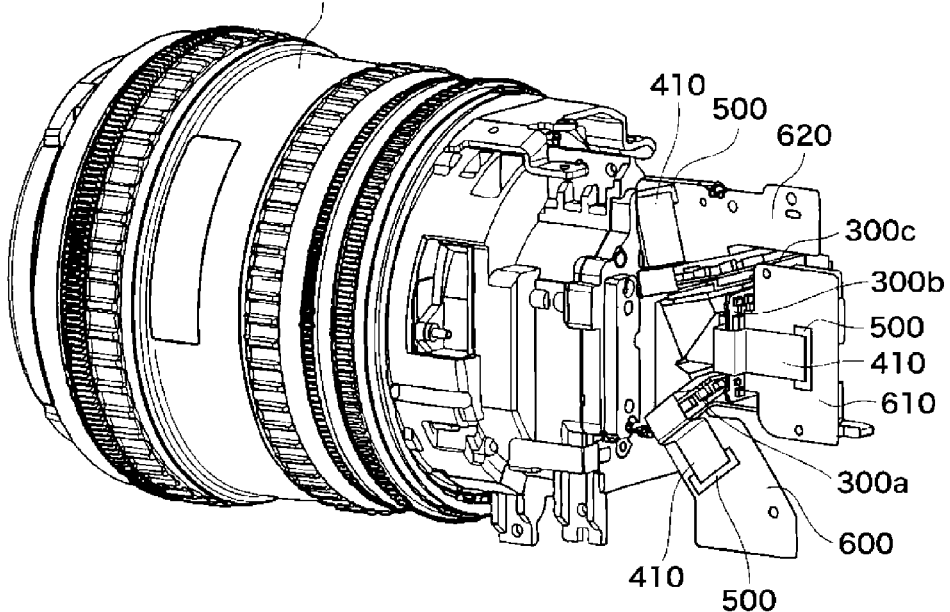
FIG. 7 is a perspective view showing a condition in which rear ends of the heat-conducting sheets of respective three heat-conducting members inserted into spaces between three substrates and three image pickup devices are placed in contact with three heat-dissipating plates.

FIG. 7 is a perspective view showing a condition in which the rear ends of heat-conducting sheets 410 of respective three heat-conducting members 400 inserted into the spaces between three substrates 300a, 300b and 300c and three image pickup devices 310a, 310b and 310c are placed in contact with three heat-dissipating plates 600, 610, and 620. Here, the heat-dissipating plates 600, 610, and 620 correspond to an example of the heat-dissipating member of the present invention.

In the present embodiment, the rear ends of the heat-conducting sheets 410 of the three heat-conducting members 400 are placed in contact with the heat-dissipating plates 600, 610, and 620 through double-sided adhesive tapes or the like. Consequently, heat generated at the image pickup devices 310a, 310b, and 310c can be conducted to exterior components through the heat-conducting sheets 410 and the heat-dissipating plates 600, 610, and 620.

In addition, since the heat-conducting sheets 410 are formed of a sheet material superior in flexibility as described above, no stress is applied to the image pickup unit 20 even if the rear ends of the heat-conducting sheets 410 of the three heat-conducting members 400 are placed in contact with the heat-dissipating plates 600, 610 and 620.

Consequently, any misalignment can be prevented from arising in the bonded parts of the three color component light-emitting surfaces 200a, 200b, and 200c of the color separation prism 200 and the image pickup devices 310a, 310b, and 310c, the fixed part of the lens unit 10 and the image pickup unit 20, and the like.

As has been described heretofore, in the present embodiment, heat generated at the image pickup devices 310a, 310b, and 310c can be efficiently released to the outside by conducting the heat to exterior components through the heat-conducting sheets 410 and the heat-dissipating plates 600, 610, and 620.

In addition, since no stress is applied to the bonded parts of the three color component light-emitting surfaces 200a, 200b, and 200c of the color separation prism 200 and the image pickup devices 310a, 310b and 310c, it is possible to avoid any misalignment between the image pickup devices 310a, 310b, and 310c and optical axes.

Furthermore, since it is only necessary to insert the heat-conducting members 400 into the spaces between the substrates 300a, 300b, and 300c and the image pickup devices 310a, 310b, and 310c and bring the rear ends of the flexible heat-conducting sheets 410 into contact with the heat-dissipating plates 600, 610, and 620, work efficiency at the time of assembly is improved.

Second Embodiment

Next, a digital video camera which is a second embodiment of the electronic apparatus of the present invention will be described with reference to FIGS. 8 and 9. It should be noted that like parts common to those of the first embodiment are denoted to FIGS. 8 and 9 by like numerals, and a duplicated description thereof will be omitted.

Figure 8:
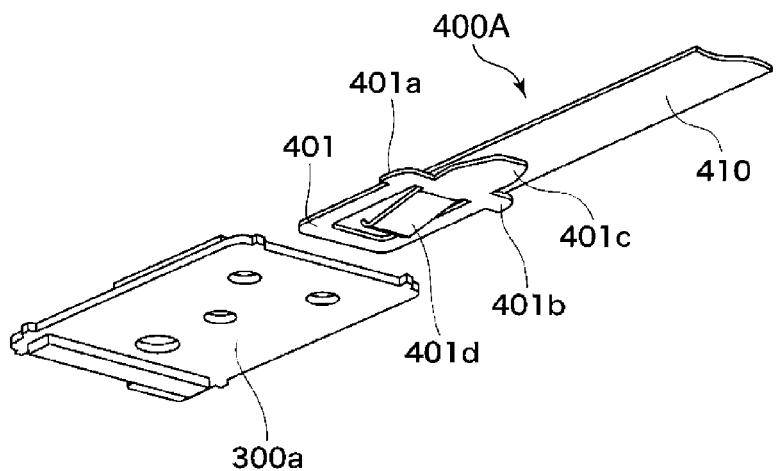
FIG. 8 is a perspective view showing a condition before a heat-conducting member is inserted into a space between a substrate and an image pickup device in a digital video camera which is a second embodiment of an electronic apparatus according to the present invention.
Figure 9:
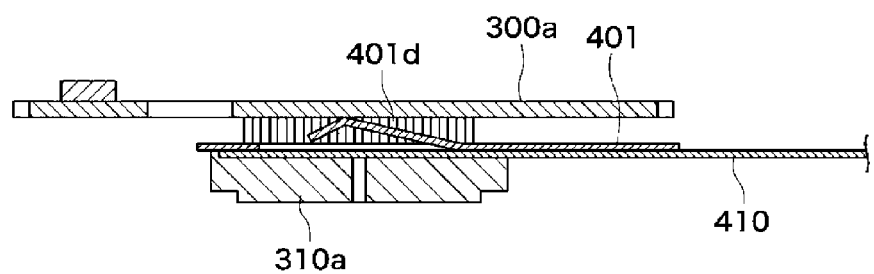
FIG. 9 is a cross-sectional view showing a condition in which the heat-conducting member of FIG. 8 is inserted into the space formed between the substrate and the image pickup device.

FIG. 8 is a perspective view showing a condition before a heat-conducting member 400A is inserted into a space between the substrate 300a and the image pickup device 310a in the digital video camera which is the second embodiment of the electronic apparatus according to the present invention, whereas FIG. 9 is a cross-sectional view showing a condition in which the heat-conducting member 400A is inserted into the space between the substrate 300a and the image pickup device 310a.

In the present embodiment, a spring piece 401d slantingly extending toward the substrate 300a side is integrally provided in a central part of the leading-end member 401 of the heat-conducting member 400A in a cantilevered manner, as shown in FIG. 8. A length from a front surface of the heat-conducting sheet 410 to an extended end of the spring piece 401d is larger than the dimension of the space between the substrate 300a and the image pickup device 310a.

As shown in FIG. 9, the spring piece 401d flexurally deforms toward the leading-end member 401 side within the space in the condition in which the heat-conducting member 400A is inserted into the space between the substrate 300a and the image pickup device 310a.

Consequently, the heat-conducting sheet 410 is pressed against and brought into close contact with a rear surface of the image pickup device 310a by a spring force of the spring piece 401d. This pressing force prevents the heat-conducting member 400A from dropping off from the space between the substrate 300a and the image pickup device 310a. The rest of the configuration and other operational effects are the same as those of the first embodiment.

It should be noted that the configuration of the present invention is not limited to those shown by way of example in the above-described respective embodiments. Accordingly, the material, the shape, the dimensions, the mode of implementation, the number of constituent elements, the location of arrangement, and the like of the present invention may be altered as appropriate, without departing from the gist of the present invention.

For example, although a digital video camera has been shown by way of example in the above-described embodiments as an electronic apparatus including an electronic component serving as a heat-generating source, the embodiments are not limited to this apparatus, but may be a digital still camera or any other electronic apparatus.

This application claims the benefit of Japanese Patent Application No. 2010-078019, filed Mar. 30, 2010, which is hereby incorporated by reference herein in its entirety.

What is claimed is:

1. An electronic apparatus comprising:
    a substrate;
    an electronic component mounted on the substrate so that a space between the electronic component and the substrate is provided;
    a heat-dissipating member dissipating heat generated by the electronic component;
    a heat-conducting member arranged to be in contact with the heat-dissipating member directly; and
    an elastic member provided on a second surface of the heat-conducting member which is opposed to a first surface of the heat-conducting member,
    wherein in a case when the heat-conducting member and the elastic member are inserted into the space, the first surface of the heat-conducting member is in contact with a rear surface of the electronic component by the elastic member being compressed, and
    wherein in a case when the first surface of the heat-conducting member is in contact with the rear surface of the electronic component, the heat-conducting member transmits the heat generated by the electronic component to the heat-dissipating member.

2. The electronic apparatus according to claim 1, wherein the elastic member includes a spring piece, and wherein in a case when the heat-conducting member and the elastic member are inserted into the space, the first surface of the heat-conducting member is in contact with the rear surface of the electronic component by the spring piece being deformed.

3. The electronic apparatus according to claim 1, wherein the electronic component is an image pickup device.

4. The electronic apparatus according to claim 1, further comprising:
   a hard member which is formed of a material harder than the heat-conducting sheet,
   wherein the hard member is provided between the heat-conducting member and the elastic member,
   wherein in a case when the heat-conducting member, the hard member and the elastic member are inserted into the space, the first surface of the heat-conducting member is in contact with the rear surface of the electronic component by the elastic member being compressed.

5. The electronic apparatus according to claim 4, wherein in a case when the heat-conducting member is not inserted into the space, a total thickness of the heat-conducting sheet, the hard member and the elastic member is larger than dimension of the space.

6. The electronic apparatus according to claim 4, wherein the hard member is formed of an insulating material,
   wherein in a case when the heat-conducting member is inserted into the space, the hard member abuts terminals disposed on two sides of the electronic component opposite to each other.

* * * * *